Jan. 18, 1966     T. F. GODLOVE ET AL     3,230,357
         DEVICE FOR THE SEQUENTIAL FILL OF INFORMATION INTO
                    DIGITAL DIFFERENTIAL ANALYZER
Filed Sept. 28, 1962                              3 Sheets-Sheet 1
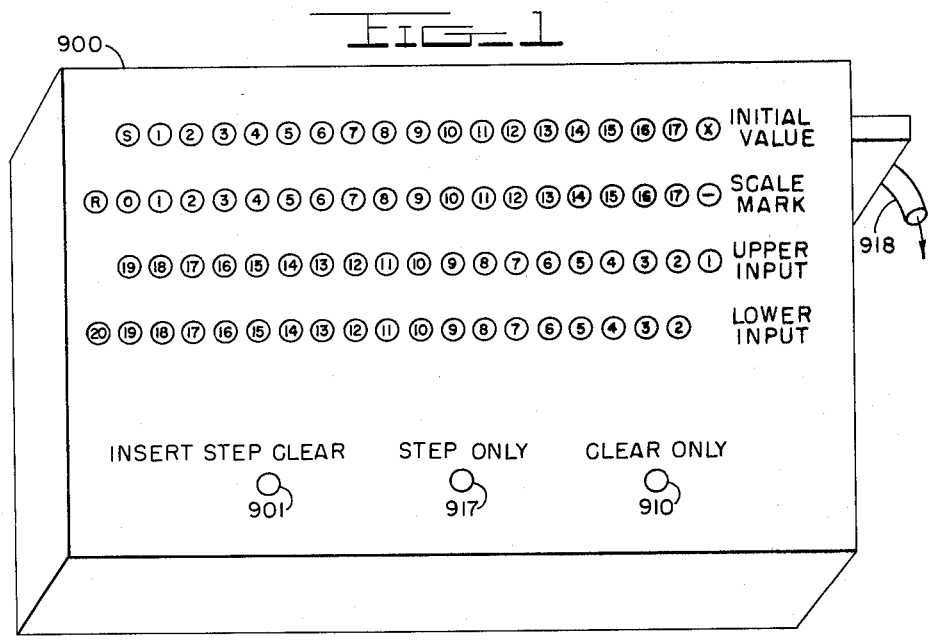
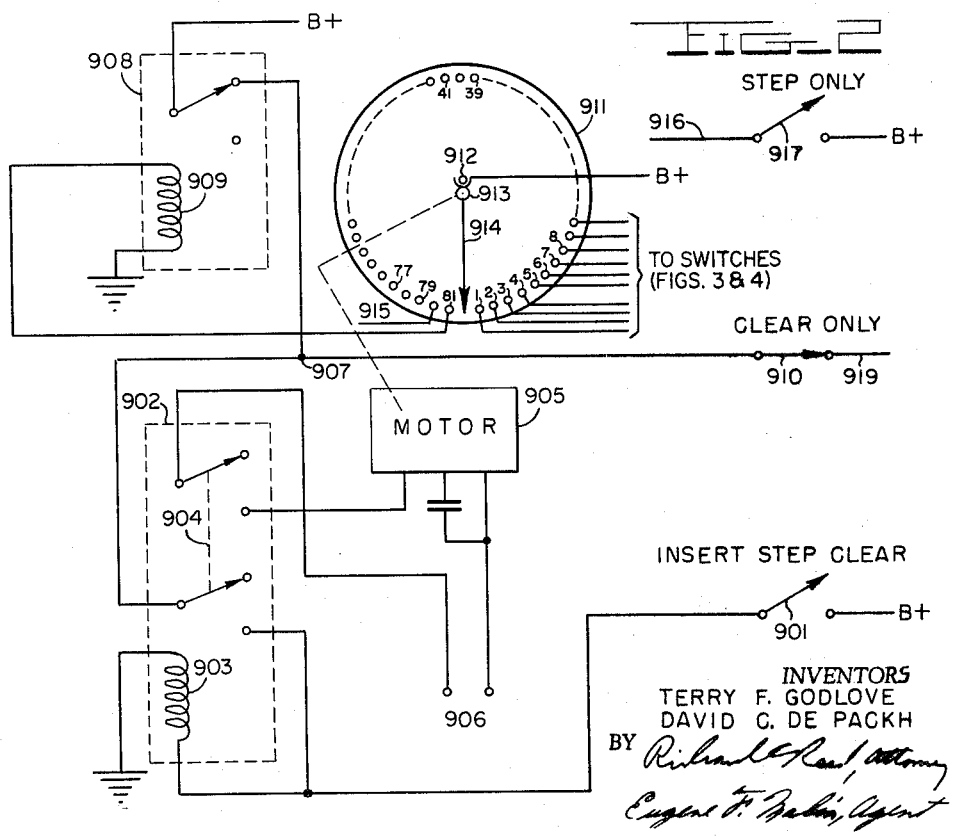
INVENTORS
TERRY F. GODLOVE
DAVID C. DE PACKH

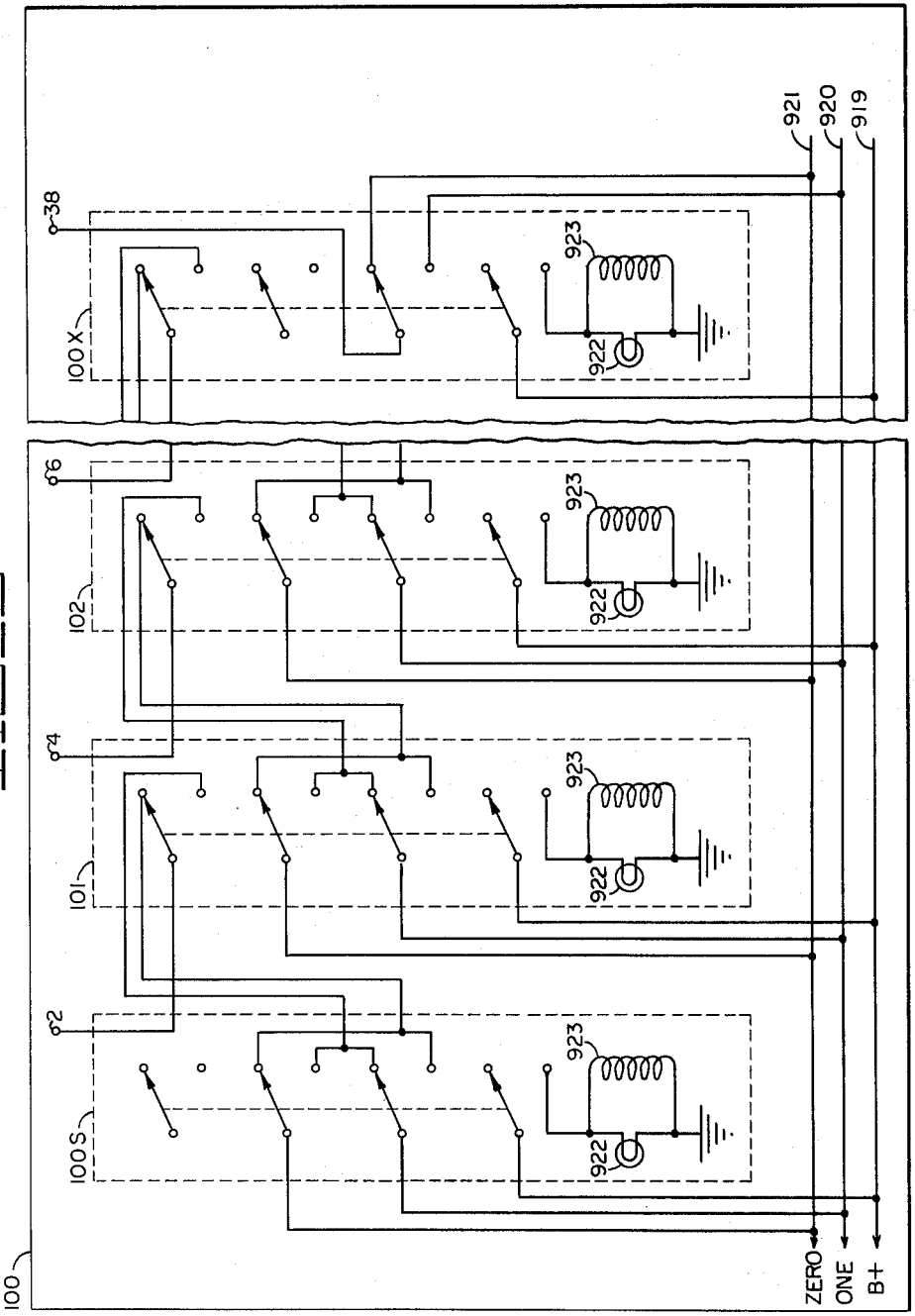

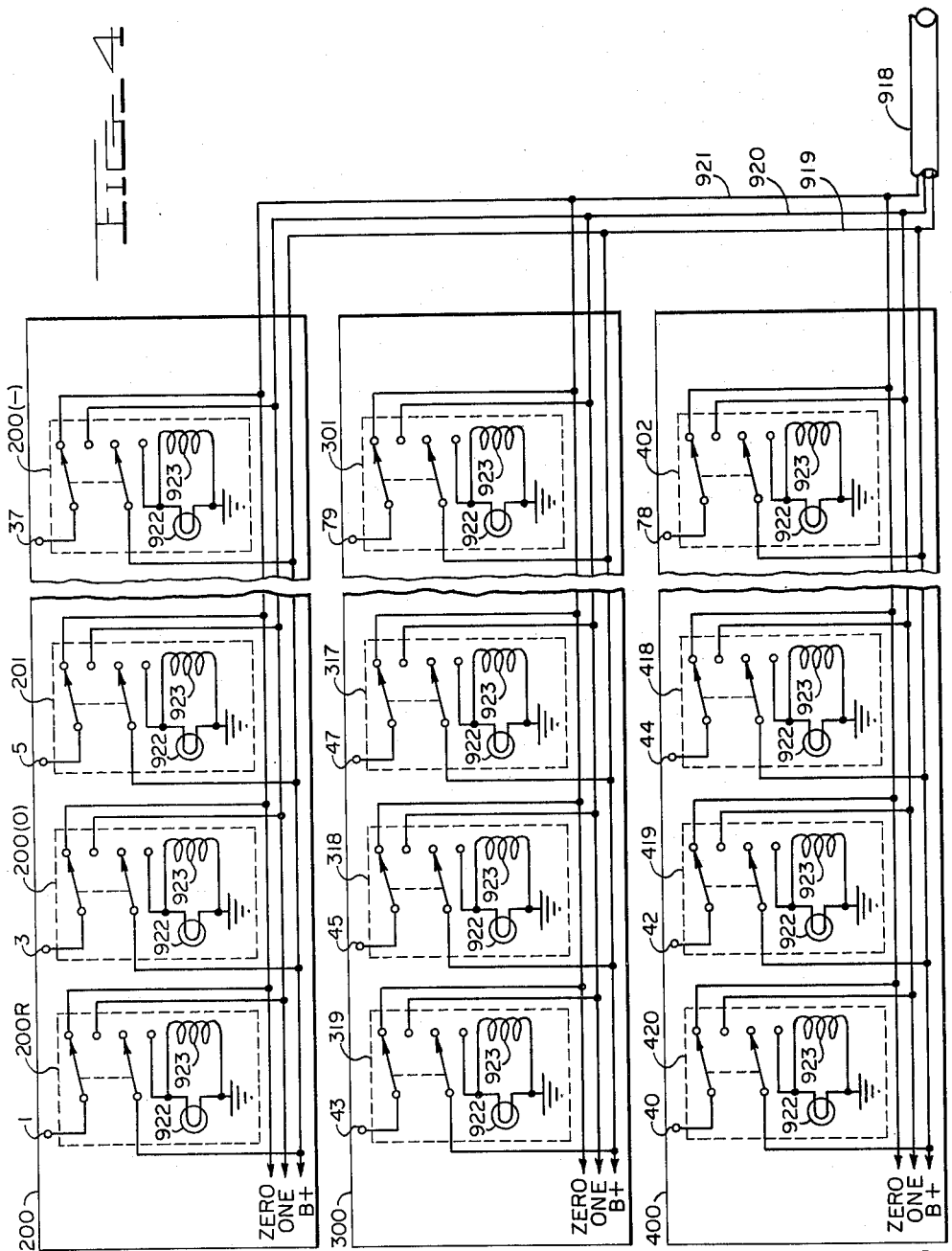

United States Patent Office 3,230,357
Patented Jan. 18, 1966

3,230,357
DEVICE FOR THE SEQUENTIAL FILL OF INFORMATION INTO DIGITAL DIFFERENTIAL ANALYZER
Terry F. Godlove, 4812 Bennett Ave., Suitland, Md., and David C. de Packh, 6585 Oxon Hill Road, Oxon Hill, Md.
Filed Sept. 28, 1962, Ser. No. 227,679
4 Claims. (Cl. 235—182)
(Granted under Title 35, U.S. Code (1952), sec. 266)

The invention described herein may be manufactured and used by or for the Government of the United States of America for governmental purposes without the payment of any royalties thereon or therefor.

This invention relates to a means for sequentially filling information into a digital differential analyzer. The operational procedure consists of preparing a flow diagram and summary sheet, then proceeding directly to the new fill device. The use of programming code sheets is eliminated. The fill device automatically inserts zeros into the digital differential analyzer and converts initial binary numbers to difference numbers.

The standard methods used for programming and filling the digital differential analyzer such as the Litton 40 DDA are described in the "Operating and Programming Manual," second edition. The standard methods can be divided into four steps. A "flow diagram" must be constructed to show the interconnection of the integrators necessary to simulate the equations. It shows the upper and lower input variables, the output variable, the "scale" of the integrand, the "scale mark," and the integrator numbers. A "summary sheet" is then filled out which summarizes for each numbered integrator used the symbol of the vaiable or the magnitude of a constant, the scale factor, scale mark, and the scaled initial and final values of the variable. The "code sheet" is prepared from the flow diagram and the summary sheet. For each integrator the following information is required: The initial value in binary (or octal) form, the scale mark, the upper and lower inputs, and any auxiliary information used as a negative sign and/or so called input exchange. In addition to the above, the initial value must be converted from a binary number to a "difference number." The Litton 40 DDA has located on the front panel a step key, a "one" key, and a "zero" key. Only one integrator can be filled at a time.

Heretofore, it has been necessary to prepare both the summary sheet and the code sheet for most problems. It has been necessary to convert each binary number to a difference number on the code sheet. Manual punching of the zeros as well as the ones into the computer has been necessary.

The fill device eliminates the use of a code sheet, because the code sheet's function of insuring the proper sequence of pulses has been built into the new device. The device automatically inserts a "zero" where a "one" is not inserted into the fill device. Automatic conversion of binary insertions to difference numbers has been built into the device. Visual checking is provided by the button lights. A saving in overall programming and filling time is accomplished by the fill device.

The object of this invention is to provide a means that will save programming and filling time.

Another object is to provide a device that will automatically convert each initial binary value to a difference number.

A further object is to provide a visual indication of the "ones" to be placed in the digital differential analyzer.

These and other objects, advantages, and novel features of the invention will be apparent from the following description and the accompanying drawings.

In the drawings:
FIG. 1 shows the push-button control arrangement.
FIG. 2 shows the commutator with its switch and drive means.
FIG. 3 shows the push-button arrangement for inserting initial values.
FIG. 4 shows the scale mark, upper input, and lower input switching means.

The new fill unit is shown in FIG. 1. It consists of an array of 77 push-button switches. The first row has 19 switches labeled "initial value." The specific wiring diagram for the first row is shown at 100 in FIG. 3. The second row has 20 switches, the third and fourth rows have 19 switches each and are labeled "scale mark," "upper input," and "lower input," respectively. The second, third, and fourth rows are designated 200, 300, and 400, respectively, and are shown schematically in FIG. 4. A separate housing is used to contain a rotating commutator switch 911 which actuates the transfer of the information registered on the push-buttons to the computer. This may be done by a cable which is plugged into the computer in a jack normally used for a paper tape punch reader. The switches contain magnetic holding means designated 923 as shown in FIGS. 3 and 4. The holding means allows "ones" to be transferred to the computer upon actuation of the commutator 911. All the switches are cleared after transferring all the information on the switch panel. This is accomplished by switch means 904 and 908 shown in FIG. 2. A depressed switch gives a visual indication by means 922 in FIG. 3 and FIG. 4. Switches 100s, 101, 102, etc., to 100x shown in FIG. 3 are four pole, double throw, for automatic conversion of the binary numbers to difference numbers. Automatic conversion is accomplished by the interconnection of each switch with the one to the right which in turn is connected to the commutator 911 by contacts 2, 4, 6, etc. Switch 100x is connected directly to contact 38.

Depressing button 901 actuates the motor relay 902. Switch 904 actuates motor 905 connecting it to a 110 volt power source through terminals 906. Switch 904 is held in an *on* position by coil 903. The motor 905 continues to rotate the commutator arm 914 after the switch 901 is released. This is accomplished by means of the connection 907 through the step-and-clear relay 908 to B+. When the commutator arm has completed a full sweep and reaches contact 81, coil 909 switches the step-and-clear switch 908 to an *off* position. Coil 903 will be de-energized and in turn actuate switch 904 to an *off* position. The motor 905 therefore will then be de-energized and the commutator arm 914 will be carried to an *off* position by momentum. Switch 908 automatically clears the board 900 removing B+ from wires 919 and therefore releasing all the depressed switches. The arrangement of the switches on the panel 900 is largely dictated by the requirements of the specific computer. A standard 32 volt power supply may be utilized and incorporated in the commutator enclosure. The commutator energizes the computer through line 915 when the contact associated with line 915 is energized to automatically "step," so it will be ready to receive the next input.

Two auxiliary push-buttons 910 and 917 are provided on the lower part of the panel 900. Button 910 is used to electrically clear the switchboard in case a wrong button is depressed. Clearing is accomplished by opening the normally closed switch 910 which would de-energize the circuit containing a magnetic hold 923. The "step only" switch 917 performs the same action as the step key on the computer, it is placed on the panel 900 for convenience.

The last button of the first row designated as "x" is not a permissible initial value. This value would be $2_{-18}$ power and is only depressed when input exchange is used and the scale mark is 17. Similarly, the first switch in the row 100 and the last switch in the lower input row 400 are missing. This is because they are forbidden for reasons having to do with the internal logic of the computer. The sequence followed by this fill device is: The initial value in binary notation is punched into the first row, shown in FIG. 1, the appropriate scale mark button is then pressed in the second row, one of the upper input buttons is depressed, one or more of the lower input buttons is depressed, and the insert-step-clear button is then depressed to actuate the commutator. The commutator rotates for one revolution during which information registered on the push-buttons is transferred to the computer. At the completion of the revolution the step-and-clear switch is turned off automatically when contact 81 of FIG. 1 is reached. At that time all depressed switches are cleared.

It should also be pointed out that negative numbers and the use of input exchange may be accomplished with minor alterations to the basic sequence of the new method. Also, the use of decision functions is quite rare and will not be discussed. If it is desired to insert an initial value in the remainder register other than zero, this can be done by punching the desired binary number in the second row, ahead of the scale mark. S and R in FIG. 1 refer to the plus signs of the initial value and remainder register, respectively. For example, to insert $+2_{-7}$ initial value, the S button and the seven button are depressed. After every third button, a line may be engraved in the panel for convenience in inserting octal numbers. In the second row 200, to insert scale mark $n$, the button marked "$n$" is depressed. For the upper and lower input rows, a new convention is adopted, which can be seen to be consistent when one examines a code sheet. The number depressed is the difference between the integrator of the computer being filled and the integrator of the computer feeding it. This difference is to be taken in a cyclic fashion. One example of setting up a difference number in the apparatus arrangement for the Litton 40 DDA, which is shown in its Programming and Operating Manual is: if, when filling integrator twenty-three, it takes its upper input from integrator six, the button marked 17 is depressed in the third row. If when filling integrator fourteen it receives its lower input from integrators thirty-five, zero zero, and six, then buttons marked 19, 14, and 8 are depressed in the bottom row. The integrators referred to above are computer components performing the integration function and may receive information inserted by means of the push-buttons of the fill device of the present invention. The upper input and lower input rows of console 900 in FIG. 1 are employed to apply two values to the integrator of the digital differential analyzer. In practice, these values can be, for example, $dx$ and $dy$ with $dx$ being the upper input and $dy$ being the lower input. The scale mark value of the second row controls the gain of the integrator.

The conversion from binary numbers to difference numbers is accomplished through the interconnection of the switches of the first row as shown in FIG. 3. The commutator arm 914 carries the B+ voltage by wiper arm 912 and shaft 913. As shown in FIG. 3 the commutator contacts 2, 4, 6, etc., carries the potential through the switches involved. Therefore, conversion is accomplished through a simple wiring arrangement. The rotating arm of the commutator is connected to 32 volts continuously and the switches 200, 300, and 400 shown in FIG. 4 apply the voltage to either the zero or the one connection, according to the switch panel setting. Line 918 carries the pulses to the digital differential analyzer.

In FIG. 3, switches 100, corresponding to the upper row of the device shown in FIG. 1, are shown schematically. When a button is pressed, holding coils 923 are energized, thereby actuating all of the corresponding poles which are normally in their upper position, which corresponds to the "zero" position, so that they are switched to the lower position, which corresponds to the "one" position. It is seen that when a push-button is pressed and holding coil 923 is energized, B+ from line 919 is applied to the indicating lamp 922 so that an indication is provided when a "one" is present, that is when a push-button is pressed. The switches are connected through contacts 2, 4, 6, etc. shown in FIG. 3, together with switch 38 to the commutator of FIG. 2, which transfers the values represented by the switches to the computer or digital differential analyzer. For purposes of illustration, the values are shown in FIG. 3 as being transferred to lines 920 and 921, which carry the values of "one" and "zero," respectively, to the digital differential analyzer when commutator arm 914 of FIG. 2 energizes its respective contact. The switches of FIG. 3, which correspond to the top row of the fill device of FIG. 1, are interconnected as illustrated in order to convert the binary information into difference notation.

In FIG. 4, switches 200, 300, and 400 are shown which correspond to the second, third and fourth rows respectively of FIG. 1. When the switch poles are as shown in FIG. 4, the push-buttons are in their normal or undepressed position, thereby indicating a "zero." Contacts 1, 3, 5, 37, 43, 45, etc., which are connected to their respective contacts on the commutator, cause B+ to be applied through the commutator arm 914 to the digital difference analyzer through line 921 which is the "zero," line. When a push-button on the device of FIG. 1 is pressed, thereby indicating a "one," holding coil 923 is energized, thereby actuating its associated switch poles so that they are moved to the other contact in the lower position. In that case B+ is applied to the commutator arm 914 to a contact corresponding to the contacts 1, 3, 5, etc. shown in FIG. 4 so that the B+ is applied to line 920, which is the "one" line. It is also seen that when a push-button is pressed and the pole is changed to its lower position, B+ is applied to the indicating lamp 922, thereby providing an indication of "one." It is therefore seen that the commutator transfers the information presented by the push-buttons of the fill device of FIG. 1 to the digital differential analyzer. The switches shown in FIG. 4 provide a direct transfer of the binary information and therefore differ from the switches shown in FIG. 3 which are interconnected to convert the binary information to difference notation.

The functional sequence of the switches of the fill device must conform to the needs of the specific computer. In this case the information was obtained directly from the code sheet. For example, the code sheet dictates that pulses 39 and 41 in the sequence must be zeros. Therefore, these two contacts are tied directly to the zero connection and are automatically inserted into every integrator.

Transient difficulties that may occur when the clear relay is actuated may be cured by means of an RC network placed across the contacts according to the standard practice.

Instead of lighted magnetic hold, push-button switches, one could use any bistable element, such as relays provided with push-button closure and an extra holding contact, or any type of electronic or semiconductor flip-flop. In such an arrangement, separate push-buttons and lights would be provided in order to realize the convenience built into the present device. If flip-flops were used, the commutator would sample the state of each flip-flop in turn and transmit it to the computer.

Instead of a mechanical motor driven commutator switch, one could use electronic or semiconductor commutator, such as glow-transfer tubes with multiple cathode outputs.

If pulses from the fill device could be transferred directly to the magnetic drum or the storage medium of the computer instead of through the intermediary of relays, then a substantial saving in speed of fill would result.

Obviously many other modifications and variations of the present invention are possible in the light of the above teachings. It is therefore to be understood that within the scope of the appended claims the invention may be practiced otherwise than as specifically described.

What is claimed is:

1. A device for sequentially filling information into a digital differential analyzer having one and zero inputs and a stepping input means comprising at least a first array of switches, said first array of switches arranged to automatically convert initial binary numbers to difference numbers, said switches being normally connected in a first position to a zero input of the digital differential analyzer and said switches being connected in a second position to a one input of said digital differential analyzer, means for releasing said switches from said second position holding means for maintaining said switches in said second position when energized, said releasing means being connected to said first holding means, a commutator means, a means for energizing said commutator, a drive means connected to said commutator, an initiating switch connected across a power source, said initiating switch starts said drive means, said commutator includes contacts, the last contact is connected to said drive means for stopping said drive means and connected to said releasing means for releasing said switches from said second position, the next to last contact is connected to said stepping input of the digital differential analyzer, and a stepping switch connected between power source and the stepping input for bypass stepping.

2. A device for sequentially filling information into a digital differential analyzer having a one input, a zero input and a stepping input, means comprising switches, said switches including a first, second, third and fourth array, said first array of switches arranged to automatically convert initial binary numbers to difference numbers, said switches being normally connected in a first position to the zero input of the digital differential analyzer, said switches being movable to a second position connected to the one input of the digital differential analyzer, a first means in said switches for holding said switches in said second position, indicating means connected to said switches, said indicating means being operable when said switches are in said second position, means for releasing said switches from said second position, said releasing means being connected to said first holding means, a commutator including a movable contact arm and a multiplicity of contacts, a means for energizing said movable contact arm, a drive means connected to said movable contact arm, a second holding means, an insert-step-clear switch connected across a power source energizing said second holding means, said second holding means connected to said drive means, the last of said commutator contacts is connected to said second holding means for de-energizing said second holding means and connected to said releasing means for releasing said switches from said second position, the next to last contact connected to the stepping input of the digital differential analyzer, a stepping switch connected between a power source and the stepping input for bypass stepping, whereby said insert-step-clear switch actuates said commutator to automatically insert an input into the digital differential analyzer in accordance with the position of the switches.

3. A filling device for filling information into a computer comprising, a multiplicity of double throw switching means for inserting zeros or ones into said computer, a first row of said switching means for inserting initial values, means in said first row connecting said switching means for converting an input of binary numbers into difference numbers, a second row of said switching means for inserting scale marks, a third row of said switching means for inserting upper inputs, a fourth row of said switching means for inserting lower inputs, a holding means for holding said switching means in one position, a position indicating means connected to said switching means, an energy source, a means connected between said energy source and said switching means for inserting the position of said switching means into the computer.

4. Apparatus according to claim 3 wherein said means for inserting the position of said switching means includes means for stepping the computer and for releasing said holding means automatically.

References Cited by the Examiner

UNITED STATES PATENTS

| | | | |
|---|---|---|---|
| 2,728,521 | 12/1955 | Benson et al. | |
| 2,758,786 | 8/1956 | Lazinski. | |
| 2,986,333 | 5/1961 | Thomas | 235—145 X |
| 3,086,700 | 4/1963 | Gustafson | 235—61 X |
| 3,099,004 | 7/1963 | Heuer | 340—364 X |

MALCOLM A. MORRISON, *Primary Examiner.*

I. KESCHNER, *Assistant Examiner.*